No. 789,885. PATENTED MAY 16, 1905.
C. P. E. SCHNEIDER.
APPARATUS FOR THE RAPID CHARGING OF GUNS.
APPLICATION FILED MAR. 24, 1903.

No. 789,885. PATENTED MAY 16, 1905.
C. P. E. SCHNEIDER.
APPARATUS FOR THE RAPID CHARGING OF GUNS.
APPLICATION FILED MAR. 24, 1903.

No. 789,885. PATENTED MAY 16, 1905.
C. P. E. SCHNEIDER.
APPARATUS FOR THE RAPID CHARGING OF GUNS.
APPLICATION FILED MAR. 24, 1903.

No. 789,885. PATENTED MAY 16, 1905.
C. P. E. SCHNEIDER.
APPARATUS FOR THE RAPID CHARGING OF GUNS.
APPLICATION FILED MAR. 24, 1903.

No. 789,885. PATENTED MAY 16, 1905.
C. P. E. SCHNEIDER.
APPARATUS FOR THE RAPID CHARGING OF GUNS.
APPLICATION FILED MAR. 24, 1903.

No. 789,885. Patented May 16, 1905.

UNITED STATES PATENT OFFICE.

CHARLES PROSPER EUGÈNE SCHNEIDER, OF LE CREUSOT, FRANCE.

APPARATUS FOR THE RAPID CHARGING OF GUNS.

SPECIFICATION forming part of Letters Patent No. 789,885, dated May 16, 1905.

Application filed March 24, 1903. Serial No. 149,370.

*To all whom it may concern:*

Be it known that I, CHARLES PROSPER EUGÈNE SCHNEIDER, ironmaster, of Le Creusot, Saône-et-Loire, France, have invented certain new and useful Improvements in Apparatus for the Rapid Charging of Guns; and I do hereby declare the following to be a full, clear, and exact description of the invention, such as will enable others skilled in the art to which it appertains to make and use the same.

By reason of the great length of the chambers of heavy modern artillery the operation of charging by means of mechanical or hand rammers consumes much time in the charging, and consequently reduces to that extent the rapidity of firing. On the other hand, in the particular case of turrets want of space behind the gun necessitates the employment either of telescopic rammers or of hand-rammers with dismountable handles in various parts. The first are complicated mechanical devices. The second requires too much time for the charging operation. In order to obviate these difficulties and also for the purpose of considerably accelerating the charging operation, I have devised the means which form the subject of this invention.

This invention consists in means which secure the complete introduction of the charge into the gun without the use of rammers by placing the projectile or charge element upon a carriage or other conveyer member and projecting the whole constituted by this carriage and the projectile or powder charge which it bears in such a manner that this latter enters the cannon and becomes wedged in place, owing to its inertia, the acceleration communicated to the projectile ceasing at the moment of its admission to the gun, while the carriage stops, owing to impact, or moves aside automatically, owing to the action of mechanical parts.

My appliance consequently comprises a movable support on which the charge is placed or a suitable conveyer and a device for securing mechanically and automatically the separation of the charge and its support at the entrance to the cannon.

I will now describe various forms of carrying my invention into practice, which are represented, by way of example, in the accompanying drawings.

Figure 3:
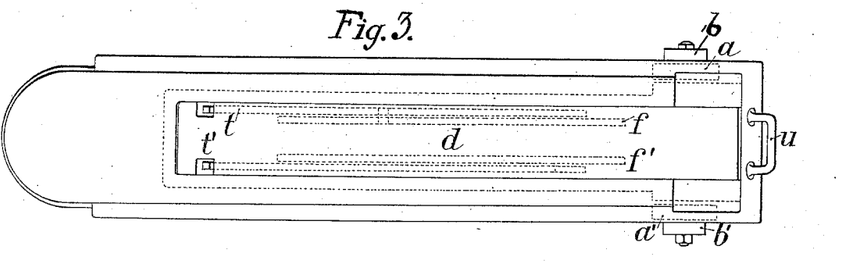
Fig. 3 is a plan view of the said conveyer.
Figure 4:
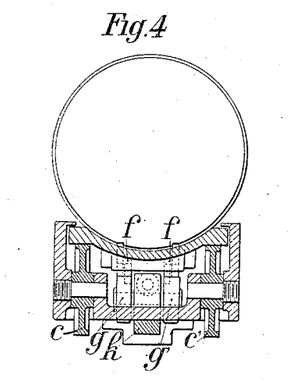
Fig. 4 is a cross-section on the line A B of Fig. 1.
Figure 5:
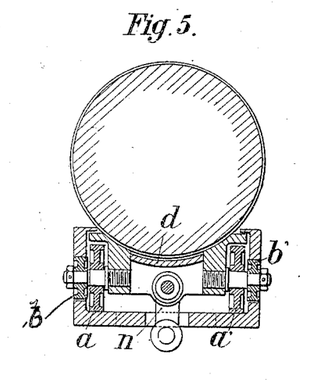
Fig. 5 is a cross-section on the line C D of Fig. 1.
Figure 7:
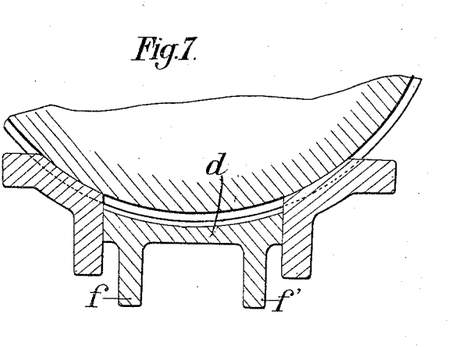
Fig. 7 is a cross-section on the line E F of Fig. 9 and represents the projectile engaged upon the conveyer by its rear band and in position for despatch.
Figure 9:
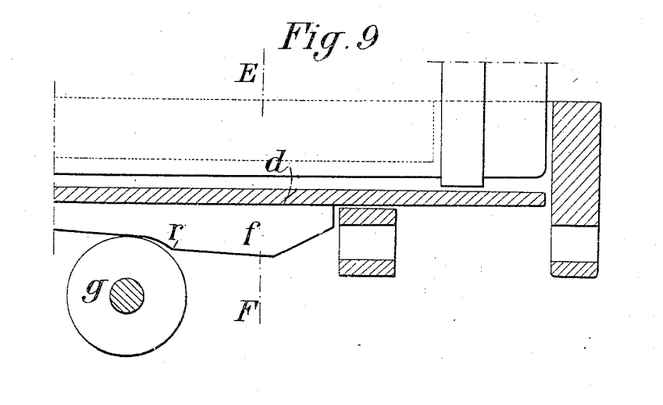
Fig. 9 represents also in a position to operate the device for separating the rear of the projectile from the conveyer.
Figure 10:
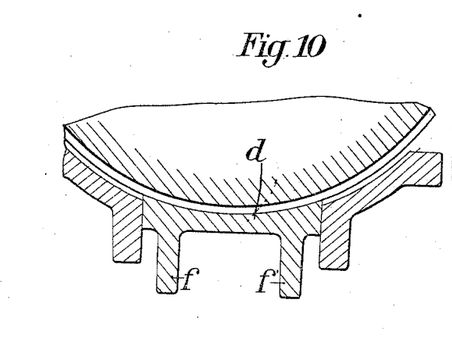
Fig. 10 shows in section the position of the rear of the projectile after the operation of the device for separating the rear portion which is shown in Fig. 9.

The conveyer is provided at its rear with a train constituted by four rollers $a$ $a'$ $b$ $b'$, mounted in pairs $a b$ and $a' b'$, each pair upon the same shaft, Figs. 3 and 5. The principal rollers $a$ $a'$ carry the weight of the rear of the carriage and its load. They travel upon the bottom of the frame, which thus serves as a track. The rollers $b$ $b'$ travel upon the top of two longitudinal recesses formed upon the upright of the frame. Their object is to prevent rocking movements of the conveyer. By means of its two upper lateral flanges the conveyer rests upon the rollers $c$ $c'$, which rotate upon shafts fixed to the frame, Figs. 1 and 4. The running-home movement is therefore produced at the rear upon a movable train and a fixed track, Figs. 1 and 5, and in front upon a movable track and a fixed train, Figs. 1 and 4. In cross-section the conveyer has the form of a cradle, the front of which forms a nose. For about two-thirds of its length the bottom is constituted by an oscillating plate $d$, Figs. 1 and 3, rocking upon a hinge-pivot $e$, Fig. 1, situated in front. This plate is strengthened below by two ribs $f$ $f'$, Figs. 1, 7, 9, and 10, the longitudinal profile of which is such that it gradually makes contact against two rollers $g$ $g'$, fixed to the frame, Figs. 1 and 9. In its initial position upon the conveyer the projectile does not bear against the upper part of the plate. It rests only upon the lateral generating-lines of the cylindrical portion situated outside and at the side of the recess or bed for the plate. The rear band is lodged in a recess of corresponding diameter, which prevents the projectile from sliding forward, Figs. 7 and 9.

Figure 1:
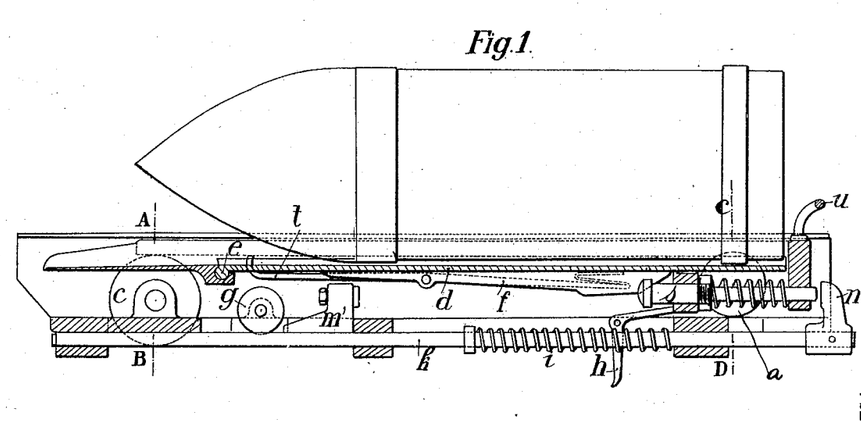
Figure 1 is a longitudinal section representing the conveyer as a whole and in its details, the appliance being arranged in place opposite the chamber of the gun. The projectile is ready to be despatched.
Figure 2:
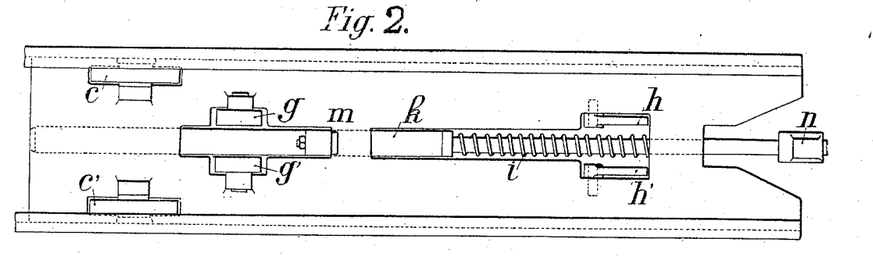
Fig. 2 is a plan view of the frame upon which the conveyer moves.
Figure 6:
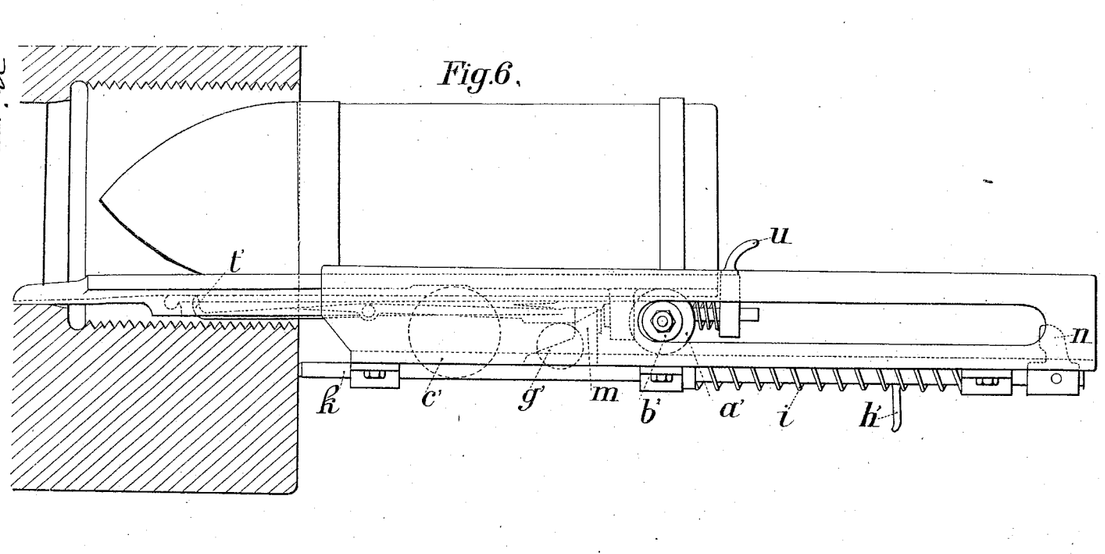
Fig. 6 represents in elevation the conveyer brought to rest at the extreme limit of its travel.

Referring now to Fig. 1, the pawls $h$ $h'$, which retain the conveyer, are released by the operator, and the conveyer and projectile are sent forward by pushing upon the base of the projectile by hand with the necessary force. As soon as the conveyer is in motion the spring $i$ expands and forces the rod $k$ forward until it bears against the face of the breech, carrying with it the front stop $m'$ and the rear stop $n$ to the dotted-line position, Fig. 6, the motion of the latter stop accelerating the forward movement of the conveyer. When the nose of the conveyer occupies the position $o$, which is represented in dotted lines in Fig. 1, the ribs $f$ $f'$ of the rocking plate have already traveled upon the rollers $g$ $g'$ and are slightly forward of the position represented in Fig. 9. Consequently the upper side of the plate $d$ has already come into contact with the lower side of the projectile. This latter is slightly raised; but its rear band is still engaged and prevents the projectile from sliding upon the conveyer.

Figure 8:
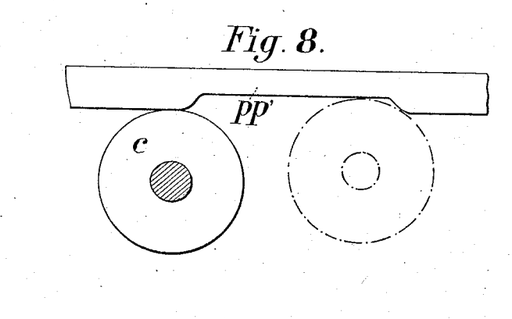
Fig. 8 represents the device for separating the front of the projectile from the conveyer. In the position here shown the device is ready to operate.

Referring to Fig. 1 and to the position $o$ of the nose of the conveyer, this nose is projected slightly within the chamber, with its lower portion some few millimeters above the lower wall of this latter. In this position the rollers $c$ $c'$ of the fixed train are below recess $p$ $p'$, (dotted lines, Fig. 8,) formed in the flanges of the conveyer, which flanges constitute the movable track. Owing to the continuation of the forward movement of the movable track and by reason of the velocity of projection, the rollers $c$ $c'$ almost immediately cease to make contact with the track, and the nose of the conveyer descends and bears against the lower wall of the chamber. At the same moment the projections $r$ $r'$ on the ribs $f$ $f'$ of the plate, Fig. 9, pass over the rollers $g$ $g'$ the plate is lifted suddenly, as is also the projectile, the rear band of which is released from engagement with the projection which retained it upon the conveyer. Owing to these two simultaneous movements—viz., sudden depression of the nose of the conveyer and sudden lifting of the projectile—more especially in the rear, the projectile becomes detached from the conveyer for a period of short duration, but one which is greater than that occupied by the conveyer in finishing its travel. Therefore at the precise moment at which the buffer of the conveyer strikes against the front stop $m'$, which occupies the dotted-line position, Fig. 6, the conveyer and projectile may be considered as suspended in space. Their adhesion being practically nil, the shock on stoppage is sustained by the wall of the conveyer, and this shock is deadened by the spring of the buffer $s$. After the sudden ascent or leap referred to the projectile again makes contact with the nose of the conveyer, slides upon it, passes through the chamber, and takes up its assigned position solely under the impulse of its inertia. As soon as the conveyer is freed from the projectile it is rapidly returned to the rear by hand by means of the handle $u$, during which movement it contacts with the rear stop $n$ and compresses the spring $i$, so that the pawls $h$ and $h'$ are again brought into engagement, as shown in Fig. 1. There is then put in place of the projectile the cartridge or one of its elements, if it is divided. This cartridge engages, by means of its envelop, upon hooks arranged at the front extremity of the two rocking levers $t$ and $t'$. Then, as in the case of the projectile, an impulse is given to the conveyer by pushing with the hand upon the base of the cartridge in position. Having reached the dotted-line position $o$, Fig. 1, the nose of the conveyer descends upon the chamber, as before, the extremities of the levers $t$ and $t'$ pass over the rollers $g$ and $g'$, rise, and thus depress the hooks. The movement of the conveyer is again arrested by the buffer, and the released cartridge continues its travel in the chamber in the same manner as the projectile.

Figure 11:
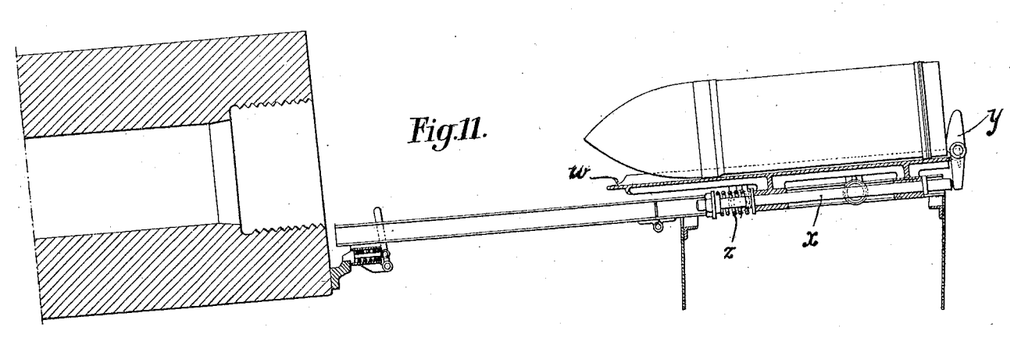
Fig. 11 is a central vertical section of a modification, showing the parts in rear position.
Figure 12:
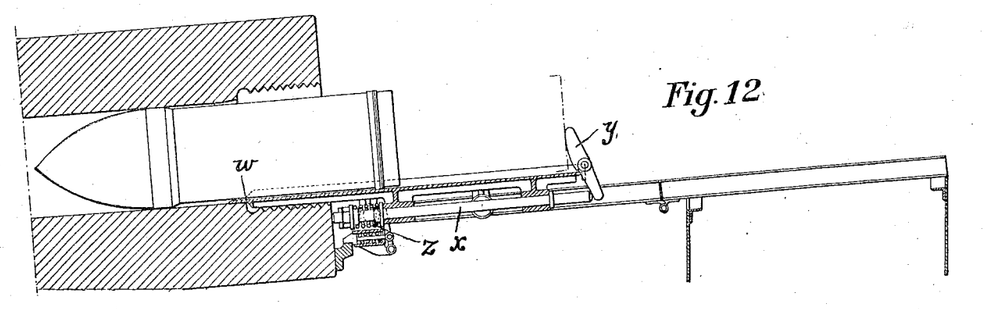
Fig. 12 is a view like Fig. 11 with the parts in the position they occupy when the projectile is in the act of entering the gun-breech.

Figs. 11 and 12 represent a second device, in which the movable support which conveys the munitions is provided with a mechanism serving to absorb its *vis viva* at the moment of contact with the rear face of the gun and utilizing this *vis viva* for imparting increased velocity to the projectile. To this end the movable support carries, Fig. 11, at its lower portion a rod $x$, which is adapted to slide in supports. The rear portion of the rod $x$ is in contact with a lever $y$, articulated upon the carriage, and the front portion, which serves as a buffer, is provided with a spring $z$. For the ramming home the movable support and the projectile are despatched together by hand, and the rod $x$ comes first into contact with the rear face of the gun, the movable support continues its movement, and the lever $y$ then rocks around its pivot. The upper portion of this lever forces the projectile forward, as represented in Fig. 12, the form of the upper portion of the lever being such that a progressive velocity is imparted to the projectile. The movable support is thus arrested by the gun by means of a yielding buffer. The movable support may then be brought back and the rod $x$ and lever $y$ resume their initial positions. The movable support is provided in front with a nose $w$, serving to protect the thread of the screw-breech.

Figs. 13, 14, 15, 16, and 17 represent a device characterized by the employment of a movable support carrying a spring-accumulator, serving to impart to the projectile and to the movable support a relative movement in opposite directions. The accumulator is arranged in such a manner as to produce its effect simultaneously upon the projectile and upon the movable support during the despatch of these parts and slightly before the movable support comes into contact with the face of the breech of the gun. This action serves to increase the velocity of the projectile and to diminish the velocity of the movable support. By means of this device the *vis viva* of the movable support will be transmitted to the projectile. There follows from this a slight acceleration of this latter and a considerable reduction of the shock of the movable support upon the gun at the moment at which this support is arrested. The movable support 1 is provided at its lower portion with a rod 2, which is adapted to slide in guides forming one with the movable support. This latter carries at its front portion a nose $w$, serving to protect the threads of the screw-breech. The rod is provided at is rear with a tappet 3, which bears upon the base of the projectile. The spring of the accumulator 4, compressed with sufficient initial tension, bears at the rear upon the movable support and in front upon a stop on the rod 2. The bolt 5 maintains the projectile in position by engaging the projection of the band during the first part of the despatch, the spring 6 constantly tending to lift the bolt 5. The rod 2 is formed with a shoulder 7, which by bearing upon the bolt 5 prevents any action of the accumulator-spring 4 before the bolt 5 has been released. The bolt 5 carries at its lower part an inclined plane 8, which is engaged by a horizontal spring-tappet 9, Fig. 17, during the forward movement of the movable support. The spring-tappet 9 acts upon the inclined plane of the bolt 5 in such a manner as to depress the bolt and release the base of the projectile and at the same time permit the rod 2 to move under the action of the accumulator-spring.

Figures 13, 16, 17:
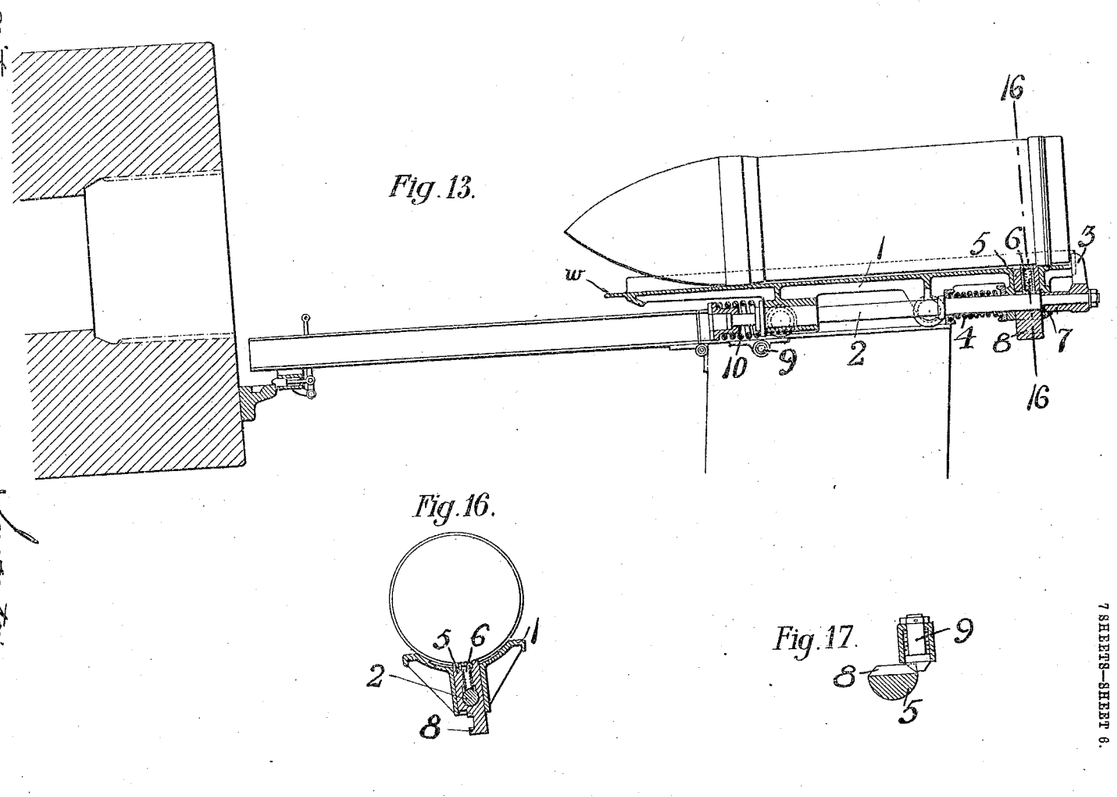
Fig. 13 is a central vertical section of another modification with parts in rear position.
Fig. 16 is a cross-section on line 16 16, Fig. 13.
Fig. 17 is a detail.
Figures 14, 15:
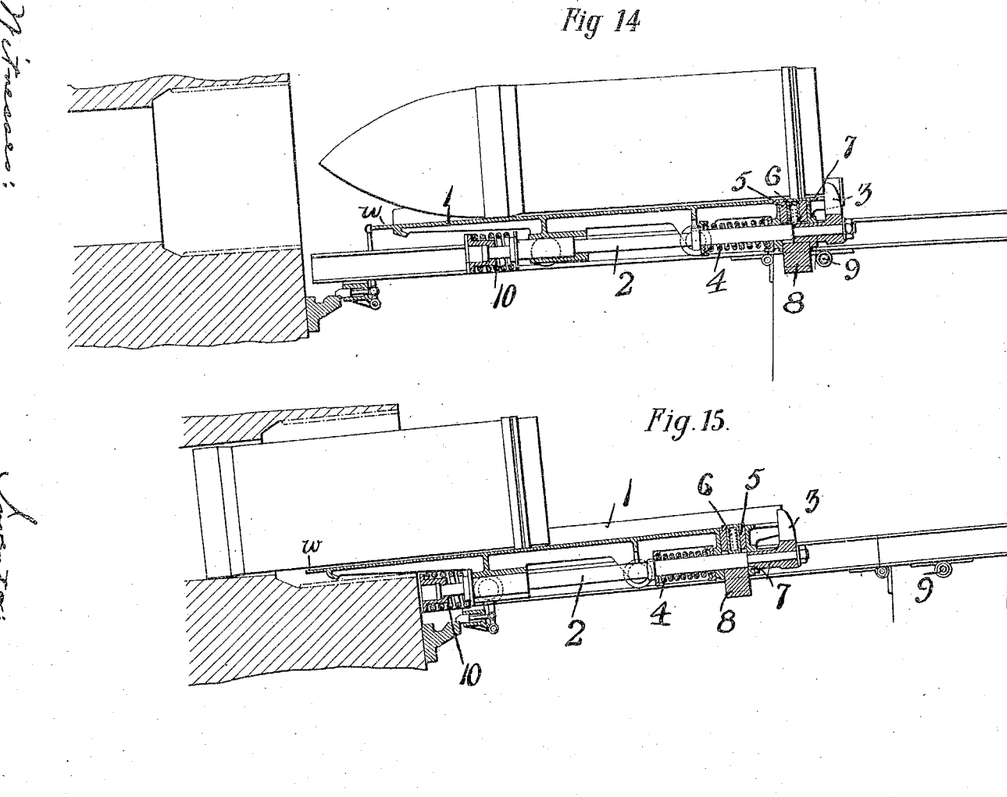
Fig. 14 is a view like Fig. 13 with the carrier moving forward, but before the projectile has begun to enter the gun.
Fig. 15 is a similar view at the instant when the projectile is entering the gun.

Fig. 13 represents the movable support and the projectile before the despatch takes place, the rod 2 being maintained in its position by the shoulder 7, which bears upon the bolt 5 and prevents the accumulator-spring from acting. The movable support and the projectile being despatched together, the inclined plane 8 of the bolt 5 comes into contact with the spring-tappet 9, and the bolt 5 is depressed. In this movement the bolt 5 releases the band of the projectile, and this latter is therefore able to continue its forward movement under the action of the spring 4, which actuates the rod 2, which is also released by the depression of the bolt 5. In this position (represented in Fig. 14) the accumulator-spring 4 acts upon the projectile by the intermediary of the tappet 3 in order to accelerate its movement and at the same time upon the movable support in order to retard it. The movable support 1 continuing its movement, the front portion of the rod 2, which carries a buffer-spring 10, comes into contact with the gun. Owing to the arrest of the rod 2, the accumulator-spring 4 is again compressed, and the bolt 5 being drawn back by its spring resumes its initial position. The projection 7 of the rod 2 being then maintained by the bolt 5, the accumulator-spring 4 is no longer able to extend. During the return movement of the movable support the spring-tappet 9 moves aside on the passage of the bolt 5.

What is claimed is—

1. In a loading device for guns, the combination of ways extending rearward in line with the gun, a munition-carrier movable along said ways, and an accelerating device operative on the forward movement of the carrier.

2. In a loading device for guns, the combination of ways extending rearward in line with the gun, a munition-carrier movable along said ways, an accelerating device and releasing device operative on the forward movement of the carrier.

3. In a loading device for guns, a frame provided with ways extending rearward in line with the gun, a munition-carrier movable along said ways, an accelerating device on said frame, and adapted to bear against said carrier on its forward movement.

4. In a loading device for guns, a frame provided with ways extending rearward in line with the gun, a munition-carrier movable along said ways, an accelerating device on said frame, and munition-releasing means on said carrier.

5. In a loading device for guns, the combination of ways extending rearward in line with the gun, antifrictional bearings or rollers located at the forward part of said ways, a munition-carrier whose forward part normally rests on said bearings or rollers, and supporting-rollers secured to the rear of said carrier and traveling along said ways.

6. In a loading device for guns, the combination of ways extending rearward in line with the gun, antifrictional bearings or rollers located at the forward part of said ways, a munition-carrier whose forward part normally rests on said bearings or rollers, supporting-rollers secured to the rear of said carrier and traveling along said ways, and means tilting the rear end of the load upward near the terminus of the forward movement of the carriage.

7. In a loading device for guns, the combination of ways extending rearward in line with the gun, a munition-carrier movable along said ways, an accelerating device operative upon the forward movement of the carrier, and means tilting the rear end of the load upward near the terminus of the forward movement of the carriage.

8. In a loading device for guns, the combination of ways extending rearward in line with the gun, a munition-carrier movable along said ways, an accelerating device operative on the forward movement of the carrier, and means tilting the rear end of the load upward near the terminus of the forward movement of the carriage.

9. In a loading device for guns, the combination of ways extending rearward in line with the gun, a munition-carrier movable along said ways, an accelerating device bearing against said carrier on its forward movement, and means tilting the rear end of the load upward near the terminus of the forward movement of the carriage.

10. In a loading device for guns, the combination of ways extending rearward in line with the gun, a munition-carrier movable along said ways, means acting to accelerate the movement of the munition during the loading action, and means tilting the rear of the load upward near the terminus of the forward movement of the carriage.

11. In a loading device for guns, the combination of ways extending rearward in line with the gun, a munition-carrier movable along said ways, means on said carrier normally restraining the munitions against forward movement relative to the carrier, and means automatically releasing the munitions during the forward movement of the carrier.

12. In a loading device for guns, the combination of ways extending rearward in line with the gun, a munition-carrier movable along said ways, means on said carrier normally restraining the munition against forward movement relative to the carrier, means automatically releasing the munitions during the forward movement of the carrier, and means tilting the forward end of the carrier as it nears the terminus of its forward movement.

13. In a loading device for guns, the combination of ways extending rearward in line with the gun, a munition-carrier movable along said ways, means for accelerating the movement of said carrier, and resilient means for taking up the momentum of the carriage on its forward movement.

14. In a loading device for guns, the combination of ways extending rearward in line with the gun, a munition-carrier movable along said ways, and means whereby an accelerating impulse may be imparted to the munition during the forward movement of the carrier.

15. In a loading device for guns, ways extending rearward in line with the gun, a munition-carrier movable on said ways, an accelerating device and munition-releasing device operative on the forward movement of the carrier, and a buffer on said carrier for diminishing shock to the carrier on its arrest.

16. In a loading device for guns, the combination of ways extending rearward in line with the gun, rollers located at the forward part of said ways, a munition-carrier whose forward part normally rests on said rollers, supporting-rollers secured to the rear of said carrier and traveling along said ways, an accelerating device, and a munition-releasing device operative on the forward movement of the carrier.

In witness whereof I have hereunto set my hand in presence of two witnesses.

CHARLES PROSPER EUGÈNE SCHNEIDER.

Witnesses:
EDMOND BLAISE,
JEAN GAMET.